Figure 1:
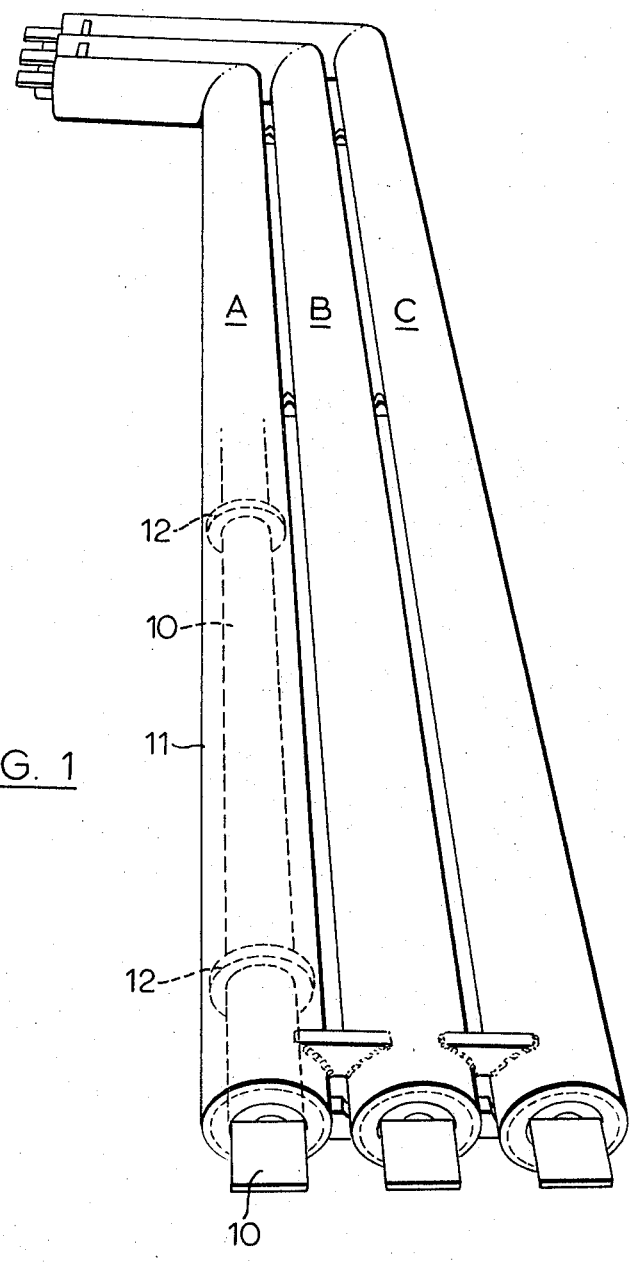

United States Patent
Rehder

[15] 3,654,378
[45] Apr. 4, 1972

[54] BUS DUCT ASSEMBLY

[72] Inventor: Robert H. Rehder, Peterborough, Ontario, Canada

[73] Assignee: Canadian General Electric Company Limited, Toronto, Ontario, Canada

[22] Filed: Mar. 12, 1971

[21] Appl. No.: 123,668

[52] U.S. Cl. ..................174/16 B, 174/28, 174/99 B
[51] Int. Cl. ..................................................H01b 9/04
[58] Field of Search ..............174/16 R, 16 B, 99 R, 99 B, 174/28, 29, 15 C, 111

[56] References Cited

UNITED STATES PATENTS

| | | | |
|---|---|---|---|
| 3,573,341 | 4/1971 | Graybill | 174/28 X |
| 3,546,356 | 12/1970 | Graybill | 174/28 X |
| 3,391,243 | 7/1968 | Whitehead | 174/28 |

FOREIGN PATENTS OR APPLICATIONS

| 1,944 | 1/1907 | Great Britain | 174/28 |
|---|---|---|---|

*Primary Examiner*—Laramie E. Askin
*Assistant Examiner*—A. T. Grimley
*Attorney*—J. Wesley Haubner, William Freedman, Frank L. Neuhauser, Oscar B. Waddell and Joseph B. Forman

[57] ABSTRACT

In isolated phase bus duct, a circular bus bar is supported coaxially inside a circular housing by means of a number of annular insulators spaced along the length of the bus inside the housing. Each insulator is in the form of a collar having a mid ring portion with annular skirts on both ends. The insulator surrounds the bus and extends radially outward from it to the housing. An elastomeric ring surrounds the bus at either end of the insulator and is compressed lightly between the bus and the inner sloping surface of the inner skirt on the insulator by means of a number of tabs secured to the bus. The outer periphery of the insulator has an annular groove which contains an elastomeric ring compressed lightly between the insulator and the housing. These rings cushion the assembly and allow the bus to move towards its position of zero forces from short circuit currents. This reduces the short circuit stresses imposed on the assembly.

4 Claims, 2 Drawing Figures

BUS DUCT ASSEMBLY

This invention relates to isolated phase bus duct assemblies, and in particular to the insulating means employed for supporting a conductor inside its housing. Its object is to provide a relatively simple bus duct assembly having good electrical and mechanical characteristics.

A bus duct assembly according to the invention consists of an elongated, circular, rigid housing; and elongated, circular, rigid conductor located inside the housing; and a plurality of insulators located inside the housing at spaced intervals along the conductor for supporting it in spaced coaxial relation with the housing. Each insulator is in the form of a collar having a mid ring portion with annular skirts on both ends. The insulator surrounds the conductor and extends radially outward from it to the housing. An elastomeric ring surrounds the conductor at either end of the insulator and is compressed lightly between the conductor and the inner sloping surface of the inner skirt on the insulator by means of a number of tabs secured to the conductor. The outer periphery of the insulator has an annular groove which contains an elastomeric ring compressed lightly between the insulator and the housing. These rings cushion the assembly and allow the conductor to move toward its position of zero forces from short circuit currents. This reduces the short circuit stresses imposed on the assembly.

Figure 2:
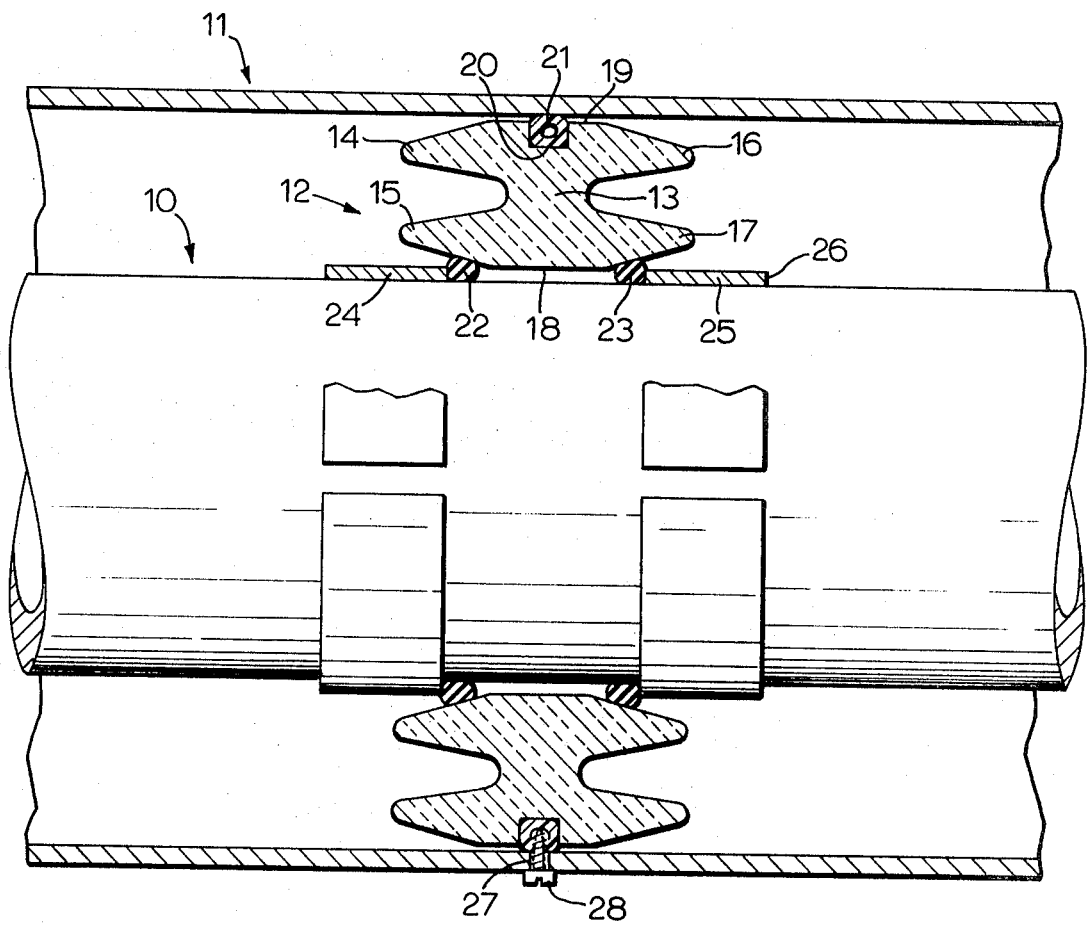

A better understanding of the invention may be had from the following description taken with the accompanying drawings, in which:

FIG. 1 is a simple diagram of an isolated phase, three phase, bus duct assembly; and FIG. 2 is a view showing an insulator of FIG. 1 and broken sections of the conductor and housing.

FIG. 1 illustrates a three-phase, bus duct system of the isolated phase type. The system consists essentially of three like assemblies or runs A, B and C wherein a rigid conductor or bus bar is enclosed in a rigid metal housing. There is a separate run for each phase, and it is usually quite long and frequently in more than one direction. The housings are supported side-by-side on suitable structure and shown interconnected at selected points along their length by means of low resistance connections for purposes of mechanical reinforcement of the housings and of allowing currents induced in each housing to circulate around a loop defined by the series combination of said housing and the other two housings connected across its ends by the low resistance connections at the ends. In each housing, the induced current flows longitudinally thereof in a direction opposite to the instantaneous current in its associated conductor 10. Allowing the induced currents to flow in this manner reduces the amount of flux escaping from the housings, as is explained in U.S. Pat. Re. 26,233—Skeats. Since phase A is typical of the three assemblies it only will be described in more detail with reference to FIGS. 1 and 2. As illustrated for phase A, each assembly consists of a rigid conductor 10 supported inside a rigid housing 11 by means of a number of insulators 12 located inside the housing at spaced intervals along the conductor. In a preferred assembly, the conductor is a circular, thick-walled, aluminum tube and the housing a circular, thin-walled, aluminum tube larger in diameter than the conductor. The insulators support the conductor coaxially inside the housing so that there is a uniform radial space between the conductor and the housing, the radial spacing being selected in accordance with the conductor voltage.

Referring now to FIG. 2, where the preferred embodiment of the invention is shown, insulator 12 is in the form of a collar having a ring mid portion 13 with one or more annular skirts on each end spaced apart radially, the ring and skirts being coaxial with the conductor. In this FIG., two skirts 14 and 15 are shown on the left hand end of the ring and two skirts 16 and 17 on the right hand end of the ring in a symmetrical configuration. The inner skirts 15, 17 may or may not be of the same shape and dimensions as the outer skirts 14, 16. Insulator 12 has an inner peripheral surface, or bore, 18 which is a loose fit around conductor 10 and an outer peripheral surface 19 which is a loose fit inside housing 11. Outer surface 19 is formed with annular groove 20 midway of the axial length of the insulator. Groove 20 contains an annular elastomeric member 21 which is compressed somewhat between the insulator and the housing. A pair of elastomeric members 22 and 23 encircle the conductor under the inner sloping surfaces of skirts 15 and 17, respectively, next to the inner peripheral surface 18. These members are compressed somewhat between the insulator and the conductor. The size and the amount of compression of members 21, 22 and 23 is selected so that, in effect, the insulator is held firmly in a centered position by them, and they act as cushions between the insulator and the conductor and housing. This permits very limited relative movement between the conductor and the housing or of the insulator itself without imposing undue mechanical stresses on the insulator. The resilient mounting is particularly advantageous during short circuits because the conductor can now move toward its position of zero force, reducing the short circuit stresses imposed on the assembly.

The position of zero force is an equilibrium position near the normal central position of the conductor into which the conductor tends to move under short circuit conditions and beyond which the conductor has no further tendency to move despite further increases in the magnitude of the short circuit current. This position is described and explained in more detail in U.S. Pat. No. 2,892,012—Swerdlow et al., where it is referred to also as the "zero force line position".

Insulator 12 may be a solid porcelain body glazed on its skirt surfaces or it may be a plastic body, as for example, a matte of glass fibers bonded together with an epoxy or a polyester resin. Members 22 and 23 may be neoprene O-rings and member 21 a length of polyvinyl chloride hose, or tubing, coiled once around the insulator. The radial dimension of the insulator determines the spacing of the conductor from the housing and it is great enough to prevent strike-over between the conductor and the housing. The surface area of the skirts is great enough to provide the creepage distance necessary.

Suitable means is provided for holding elastomeric members 22 and 23 in place between the insulator and the conductor, whereby the insulator is secured to the conductor in a manner that blocks substantial axial movement of the conductor relative to the insulator. In a preferred form of the invention, this holding means comprises two or more retaining tabs welded to the conductor at spaced intervals around it at either end of the insulator as illustrated at 24 and 25. The illustrated tabs are curved plates, e.g., two semicircular plates for each member, abutting the elastomeric members 22 and 23 so as to compress them slightly between the conductor and the insulator and between the tabs and the tapered surfaces of the insulator. The retaining tabs are welded to the conductor along an edge 26 farthest from the insulator. There is usually no need to secure insulator 12 to housing 11 in runs having one or more bends in the run because the bends serve as means for transmitting forces axially of the conductor to the housing. It is, however, good practice to secure one insulator to the housing as well as the insulator to the conductor in a straight run having a significant vertical component of direction. This may readily be done by drilling three or four small holes 27 through the wall of the housing at equally spaced intervals around the housing directly opposite elastomeric member 21, and driving a self-tapping screw 28 into each hole, the screw being long enough to penetrate tubing 21 and extend well into it. In a straight run, only one insulator is secured to the housing; the others are not secured to the housing, but are free to move with thermal expansion and contraction of the conductor and housing.

The presence of elastomeric rings 22 and 23 makes it unnecessary to provide a precise fit between the bore of insulator 12 and the outer periphery of conductor 10 and thus facilitates assembly of each insulator about the conductor. In this respect, the bore of each insulator 12 is made sufficiently larger than the conductor to provide a clearance space between the bore and conductor periphery that permits the insulator to be easily slid into its proper position on the conductor without interference from minor surface irregularities and despite minor size variations in these two parts. After the insulator is in its desired position, the elastomeric rings are positioned within the tapered portions of the insulator bore and are forced toward each other to produce a wedging action that lightly compresses the rings between the bore and the conductor, forcing them to take up the clearance space and to provide a connection between the insulator and the conductor which prevents significant axial movement of the conductor relative to the insulator.

The presence of the elastomeric outer ring 20 likewise facilitates assembly of the housing 11 over the insulators 12. When the housing 11 is slipped over the insulator, the ring 20 yields slightly to accommodate surface irregularities and size variations between these two parts. Clearance space between the insulator and the housing is taken up by the elastomeric ring.

While I have shown and described particular embodiments of my invention, it will be obvious to those skilled in the art that various changes and modifications may be made without departing from my invention in its broader aspects; and I, therefore, intend herein to cover all such changes and modifications as fall within the true spirit and scope of my invention.

What I claim as new and desire to secure by Letters Patent of the United States is:

1. A bus duct assembly comprising:
   a. an elongated circular housing;
   b. an elongated circular conductor located inside said housing coaxially therewith, said conductor having an outside diameter substantially less than the inside diameter of said housing;
   c. at least one insulator located inside said housing and supporting said conductor, said insulator comprising a collar surrounding said conductor and having a mid ring portion and at least one annular skirt on each end of the ring portion surrounding said conductor, said collar having an inner and an outer periphery located near said conductor and said housing respectively;
   d. a pair of first elastomeric rings surrounding said conductor at opposite ends of said inner periphery;
   e. means for lightly compressing said elastomeric rings between said conductor and said inner periphery;
   f. and an additional elastomeric ring surrounding the outer periphery of said collar and positioned in lightly compressed relationship between said outer periphery and said housing, said elastomeric rings allowing limited radial movement between said conductor and said housing.

2. The bus duct assembly of claim 1 in which said collar has an annular groove in said outer periphery in which said additional elastomeric ring is positioned.

3. The bus duct assembly of claim 2 in which said additional elastomeric ring is a one-turn length of tubing and in which a plurality of screws are threaded through the wall of said housing into said tubing to secure said insulator to said housing.

4. The bus duct assembly of claim 1 in which:
   a. said inner periphery has tapered portions at its axially opposite ends against which said first elastomeric rings abut, and
   b. said means for compressing said first elastomeric rings comprises retaining structures secured to said conductor at the axially outer sides of said first rings in positions that result in each of said first rings being compressed between one of said retaining structures and one of said tapered portions.

* * * * *